W. F. GRAMS.
CABLE WINDING DEVICE.
APPLICATION FILED SEPT. 25, 1919
1,367,811.
Patented Feb. 8, 1921.
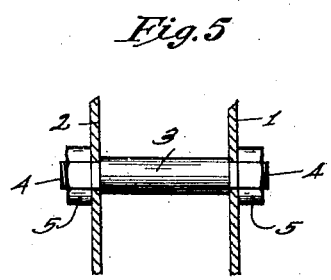
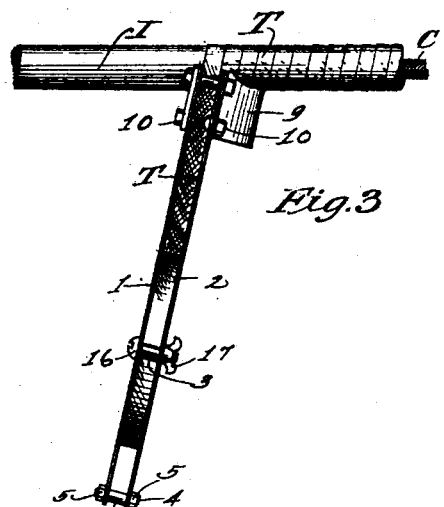
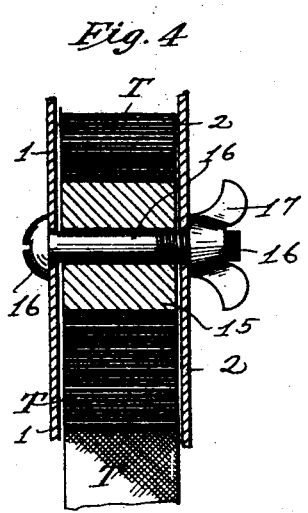
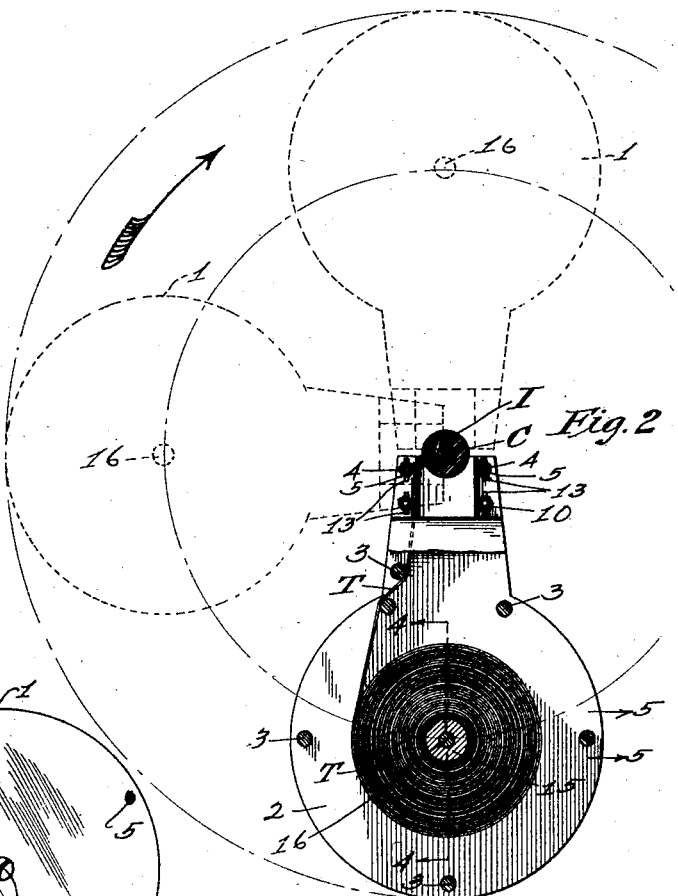
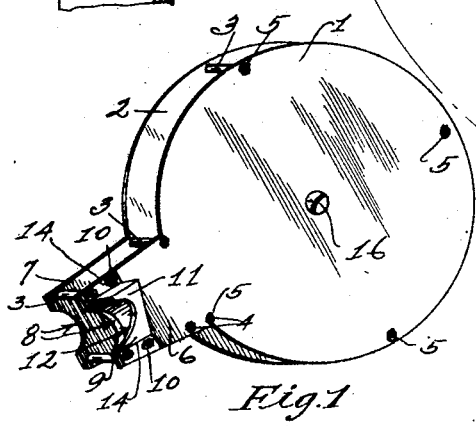
INVENTOR:
Walter F. Grams,

UNITED STATES PATENT OFFICE.

WALTER F. GRAMS, OF VENICE, CALIFORNIA, ASSIGNOR TO METRO-PICTURES CORPORATION, OF LOS ANGELES, CALIFORNIA.

CABLE-WINDING DEVICE.

1,367,811.             Specification of Letters Patent.        Patented Feb. 8, 1921.

Application filed September 25, 1919. Serial No. 328,610.

*To all whom it may concern:*

Be it known that I, WALTER F. GRAMS, a citizen of the United States, and a resident of Venice, in the county of Los Angeles and State of California, have invented new and useful Improvements in Cable - Winding Devices, of which the following is a specification.

This invention relates to and has for its main object the provision of a device for winding tape or fabric or the like, around the peripheries of electric cables, such as are used for high tension currents.

Cables of this character are used largely in motion picture producing plants and other plants of like character for conducting electric current of high amperage, and in their manufactured form comprising a metallic conductor surrounded by a substantial covering of insulation, which, while serving to thoroughly insulate the conductor under ordinary circumstances and usage, is insufficient as an armor where the cable is portable and is subjected to rough usage and handling.

Particularly in motion picture producing plants, cables of this character are connected with suitable cut-out boxes of portable nature, and are moved from place to place with the said cut-out boxes for connection with different lighting systems for providing light on the subjects of the pictures. It is understood, of course, that such cables are covered with a composition which is easily pierced and broken by rough usage, and it is, therefore, an object of this invention to provide means whereby a covering of fabric tape may be quickly and neatly wrapped around the periphery of the cables so as to more completely insulate and protect the same against damage and wear.

A further object of my invention is to provide in a device of the character named, a suitable holder for a reel of wrapping tape, together with friction means for regulating the feeding of the tape to the cable.

Still another object is to provide means at the feeding portion of my device for adjusting and regulating the lead of the tape on the cable to a desired extent. Other objects may appear in the following description.

Referring now particularly to the drawings, forming a part of this application and annexed hereto:

Figure 1 is a perspective view of my improved device;

Fig. 2 is a side view of the same in position on a cable for winding the tape thereon, one side being broken away to show the tape and different positions of the device relative to the cable, being indicated in broken lines;

Fig. 3 is a longitudinal view of the cable and an edge view of my device in position for winding the tape on the cable;

Fig. 4 is a section on line 4—4 of Fig. 2;

Fig. 5 is a section on line 5—5 of Fig. 2.

In the drawings hereinbefore mentioned, I have shown one practical embodiment of my invention together with certain novel structural details and arrangement of parts, which I will now describe.

My device comprises a pair of like flat plates 1 and 2, which are held in spaced relation by a plurality of spacers 3, having threaded ends 4, extending through the plates 1 and 2, and nuts 5, on the ends 4, whereby the plates may be removably held together. Extensions 6 and 7, are provided, respectively, in opposed relationship on the plates 1 and 2 and the ends of said extensions are provided with semi-circular depressions 8, which are adapted to approximately conform to the diameter of the insulation I of a cable C. The extension 6, has a fixture 9, attached thereto by means of bolts 10, and said fixture has an outwardly inclined portion 11, with a semi-circular depression 12 therein, which is alined with the depression 8 of the plate extensions 6 and 7. The bolts 10 and the ends of the spacer bolts 4, extend through elongated slots 13, in the flat portions 14 of the fixture 9, so that the depression 12 in the portion 11 of said fixture may be adjusted relative to the axis of the plates 1 and 2, so that when the device is in position on the cable C, as shown in Fig. 3, the operating angle thereof relative to the cable will determine the lead of the tape to be wound thereon. The tape T may be held on a suitable core 15, which may be removably carried between the plates 1 and 2 on a bolt 16, having a wing nut 17, on the threaded end thereof, whereby the plates 1 and 2 may be drawn together in the center and thus exert friction on the tape T and the core 15.

The arrangement of the spacers 3, between the plates 1 and 2 may be made to suit convenience, and as indicated in Fig. 2, the tape T may be threaded between certain of the spacers 3, so as to further exert friction on the tape as it is wound on the periphery of the cable C, so as to render the winding thereof tight and compact. When a reel of cable has been exhausted, a new reel may be substituted therefor by removing the wing-nut 17 and the bolt 16, so that the core 15 may be moved outwardly from between the plates 1 and 2. When a new core with tape thereon is in position in the center of the plates, the bolt may be inserted therethrough and the wing nut tightened to a desired extent. The end of the tape is then threaded beween the spacers 3 in any desired manner and placed on the periphery of the cable to be wound. The winding device is then placed against the periphery of the cable in the manner indicated in Figs. 2 and 3, the lead of the tape on the cable having been first determined by the adjustment of member 9, and the winding device is then bodily moved in a circular path, as indicated in Fig. 2, around the cable C, until the entire length of the cable is wrapped with the protecting tape T.

The use of my winding device economizes largely in the wrapping of cables of the character described and is practical and efficient.

I do not desire to limit myself to the specific form of combination of elements shown and described, except, as I may be limited by the scope of the appended claims.

What I claim is:

1. A device of the character described comprising plates spaced apart and having like projections at points on their periphery for feeding the tape therebetween, a tape reel rotatably carried between said plates, means for regulating the friction between said plates and said reel, and means on one of said plates and engaging said cable for regulating the winding angle of said tape.

2. A cable wrapping device comprising a holder having spaced sides of disk-like character connected at points near the periphery thereof, a reel of tape frictionally held between said sides and adapted to be wound on a cable, and means adjustably carried on one side of said holder and engaging said cable, whereby the winding angle of said tape may be regulated and determined, at will.

3. A cable wrapping device comprising a holder having a central cave and spaced sides thereon and adapted to be rotated about the axis of a cable, a reel of tape rotatable on said holder and adapted to be fed to the periphery of said cable during the rotation of said holder, and means held on one of said sides for adjusting the lead of the tape on said cable.

4. A tape wrapping device having like plates held in spaced relation, a core intermediate said plates, like projections being provided on said plates having cable engaging portions for feeding plates spaced apart at points near the periphery.

5. A tape wrapping device comprising a core for holding the tape, plates held on the ends of said core and having opposite extensions thereon adapted to engage the cable at their outer edges, spacers between said plates and said extensions, and a cable engaging member held on one of said plates and adjustable for regulating the winding angle of the tape.

6. A tape wrapping device comprising spaced plates having cable engaging extensions provided with concave portions on their outer edges, spacers near the outer corners and at the junctions of said extensions with said plates, for guiding the tape therebetween, and means for adjustably holding the device in engagement with the cable.

7. A tape wrapping device including a pair of detachable plates, a core held therebetween for holding the tape, a series of spacers between said plates near their periphery, said plates having cable engaging portions at opposite points thereon, and an adjustably held member on one of said plates for regulating the winding angle of the device.

Signed at Los Angeles, county of Los Angeles, and State of California, this 15th day of September, 1919.

WALTER F. GRAMS.

In presence of—
C. P. BUTLER.